United States Patent [19]

Vacant

[11] Patent Number: 4,835,995
[45] Date of Patent: Jun. 6, 1989

[54] MACHINING DEVICE, ESPECIALLY FOR A ROBOT USED FOR THE CARDING OF LEATHER

[75] Inventor: Andre Vacant, Tiffauges, France

[73] Assignee: GEP Groupe Pasquier, Saint Germain Sur Moine, France

[21] Appl. No.: 58,084

[22] Filed: Jun. 4, 1987

[51] Int. Cl.⁴ .............................................. C14B 1/44
[52] U.S. Cl. ......................................... 69/6.5; 69/40; 901/41
[58] Field of Search .................. 12/57.5; 69/6.5, 9, 69/39, 40, 46; 901/41

[56] References Cited

U.S. PATENT DOCUMENTS 3,174,170 3/1965 Verreault et al. ................. 69/6.5 X
3,267,705 8/1966 Simmonds, Jr. et al. ............ 69/6.5
4,416,031 11/1983 Shutt et al. ....................... 69/6.5 X

FOREIGN PATENT DOCUMENTS 2119692 11/1983 United Kingdom ..................... 69/9

Primary Examiner—Wm. Carter Reynolds
Attorney, Agent, or Firm—Seidel, Gonda, Lavorgna & Monaco

[57] ABSTRACT

A machining device for a robot used for the carding of leather comprises a tool holder head (11, 11a) for receiving a driven rotary tool (24), a movable assembly (12, 8, 9, 20) adjustable in the effective direction of the tool and provided with a rigid arm (3) carrying the head (11, 11a). The device includes strain-gauge sensors (10) for measuring the force exerted by the tool (24), and the support (2) carrying the movable assembly and connected to the end (1) of the robot arm (3). The device also includes a control circuit (17) which receives the signals from the strain-gauge sensors (1) and controls the movement of the movable assembly (12, 8, 9, 20) in order to make the pressure exerted by the tool on the workpiece subject to a nominal value.

2 Claims, 2 Drawing Sheets

MACHINING DEVICE, ESPECIALLY FOR A ROBOT USED FOR THE CARDING OF LEATHER

The present invention relates to a machining device intended especially to be fastened to the end of a robot arm, which can be used particularly for the carding of the uppers of shoes and for clipping or other machining processes in techniques different from that of shoe-making.

There are many tools which are fastened to the end of a robot arm, such as, for example, cutting and welding tools, handling tongs, paint guns, etc., in many fields of activity, particularly in motor-vehicle construction.

However, in some sectors, it is difficult to transfer the work of a man holding a tool to an automatic machine. This is particularly true in fields of activity using materials of animal or vegetable origin, the characteristics of which are not strictly constant. Thus, in the production of foot-wear articles with moulded soles, the carding of the lower edge of the upper of the shoe before the moulding of the soles is carried out by means of a hand-held motor-operated tool. To make the work easier, a template is placed on the upper of the shoe to limit the region beyond which carding must not take place. Apart from the fact that the worker has to hold his motor-operated tool in his hand and at an angle inclined relative to the vertical and the horizontal, usually an angle of 45°, the work is relatively difficult; the cutter very quickly damages and destroys the template. Moreover, the pressure at which carding is carried out is relatively uniform, but lacks accuracy.

Furthermore, to ensure flexibility in production, there have to be frequent changes of moulds which involve as many adjustments of the templates. If these adjustments are not made carefully, the quality of the product will be adversely affected.

Now, the quality of the bonding of the sole to the upper of the shoe and the appearance of the footwear article thus produced depend on the carding accuracy.

The object of the present invention is to provide a machining device making it possible to automate some machining jobs by means of a cutter or similar tool requiring a relatively constant pressure to be exerted, despite the hazards which the tool may encounter along its machining path, in particular the carding of the leather of the uppers of shoes.

To this end, the invention relates to a device of the abovementioned type, characterized in that it is composed of a toolholder head for receiving a driven rotary tool, of a movable assembly adjustable in the effective direction of the tool, provided with a rigid arm carrying the head and equipped with strain gauges for measuring the force exerted by the tool on the workpiece, of a support connected to the end of the robot arm and carrying the movable assembly, and of a control circuit receiving the signals from the strain gauges and controlling the movement of the movable assembly in order to make the pressure exerted by the tool on the workpiece subject to a nominal value.

The device according to the invention is of a particularly simple structure, allowing it to be used for machining pieces of complicated shape or difficult to define exactly in geometrical terms, such as, for example, the closing lines (called the gum-cutting lines) of a mould for the direct injection of a shoe sole onto an upper.

The adjustment of the pressure exerted by the tool is carred out in the direction in which the tool is applied. This adjustment is subjected automatically to a nominal pressure signal, the actual pressure being detected by menas of the flexible support carrying the tool.

The machining device thus produced has a very compact structure which is simple and which allows it to be used in the shoe industry.

In addition to its simplicity, this structure is also very robust.

According to an especially advantageous characteristic, the means of driving the tool consists of a motor connected to the tool by means of a transmission, of which at least the part between the support and the toolholder head is formed by a flexible cable for transmitting a rotary movement.

This characteristic is important for the accuracy of pressure control, since the flexible cable ensuring the transmission of the rotary movement from the upstairs part of the transmission at the output of the motor or drive means up to the head does not distort the pressure control which, for the carding of a shoe upper, corresponds to an effect of approximately one kilogram. The lightness of the device and its great flexibility because of the separation of the toolholder head and the support make it possible to reduce the control inertia considerably.

Thus, particularly in the field of shoemaking, in which the materials used can be have characteristics of relatively little uniformity, with excess thicknesses, etc., the pressure control is carried out in a highly flexible way and, above all, very quickly.

Even though this flexible transmission does not have a rigidity detrimental to the control accuracy, it transmits relatively high torques which are, above all, compatible with the work to be carried out by the tool carried by the toolholder head, such as a carding tool.

Since the end of the arm of a robot can move in three dimensions and rotate on itself, it is necessary to drive the tool by a transmission means not passing through this end of the robot arm. According to the invention, this transmission is obtained in an especially advantageous way, in that the support carries an arm pivoting above the axis of the support containing a belt transmission passing over two pulleys, the first being coaxial to the pivot axis of the arm and the second being at the end of the arm, so as to be connected to the end of the flexible cable, the other end of which is connected to the toolholder head.

This connection for movement transmission gives a high freedom of movement to the end of the arm and to the machining device carried by this end. Since the machining device must be capable of executing a little more than one complete revolution, the deflection of the pivoting transmission arm will allow the toolholder to rotate approximately one and a half revolutions, without the flexible transmission interfering with the wrist or arm of the robot. Advantageously, since the machining device does not have to execute a complete revolution on itself, it is expedient to limit the pivoting of the pivoting arm about its axis by means of stops.

According to another advantageous characteristic of the invention, the device has a relatively flexible second strip, one end of which is fastened to the rigid support and the other end of which carries a weight, this strip also having a strain-gauge sensor connected to the control circuit, in order to take into account the inertia of the device during its working movement.

This compensation means is particularly useful when the device is working rapidly, as in the shoe industry. In fact, only a few seconds are needed for the device to card one shoe.

According to another advantageous characteristic of the invention, the adjustable movable assembly is connected to the support by means of a controlled double-acting jack which ensures that the pressure of the tool is subject to the nominal pressure. In particular, this jack can be a pneumatic jack which offers the advantage of high operating flexibility.

Advantageously, this double-acting pneumatic jack can be a so-called "frictionless" jack comprising two bellows acting either side of a piston, the latter not bearing on the walls of the cylinder.

The present invention will be described in more detail by means of an exemplary embodiment of a machining device according to the invention, illustrated diagrammatically in the accompanying drawings in which.

Figure 1:
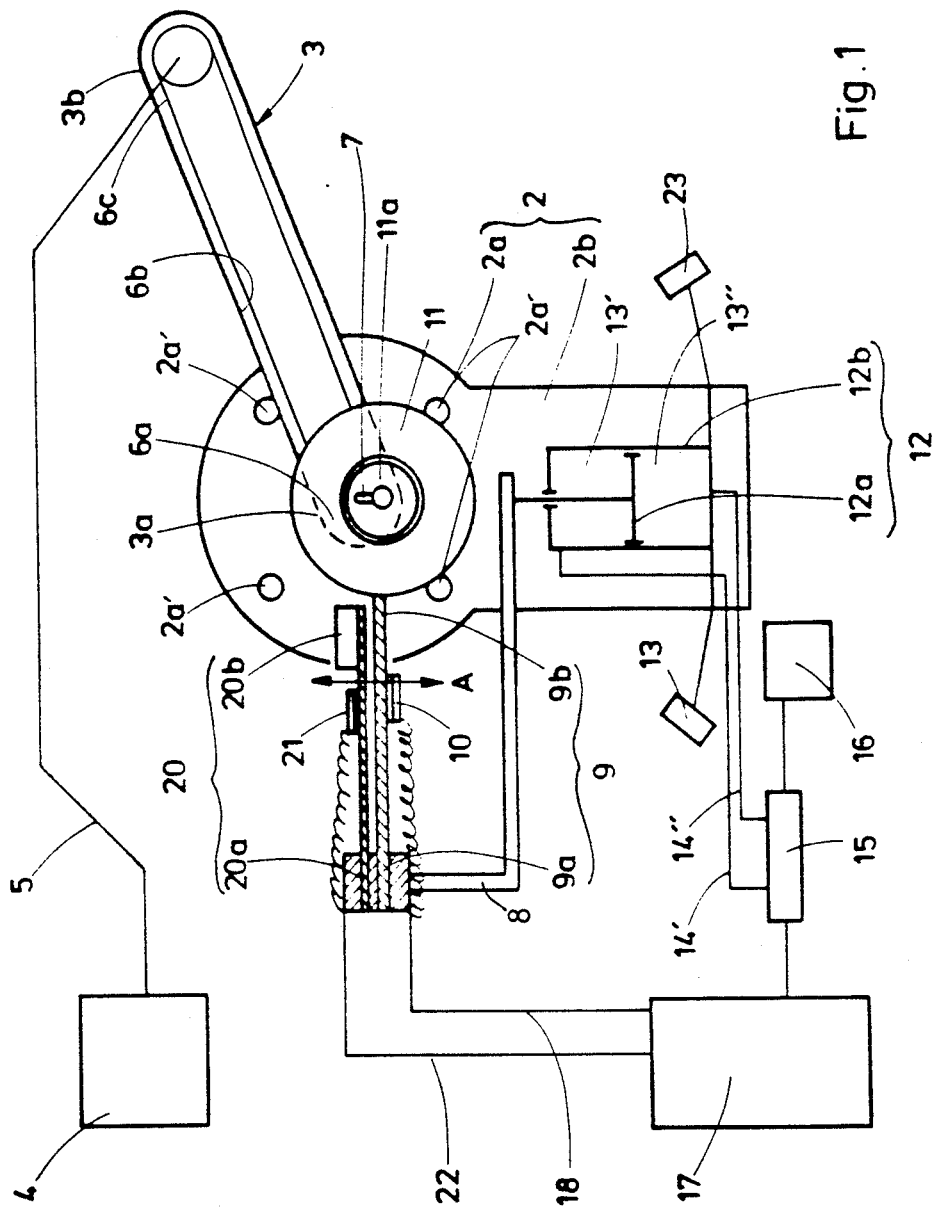
FIG. 1 is a front view of a device according to the invention.
Figure 2:
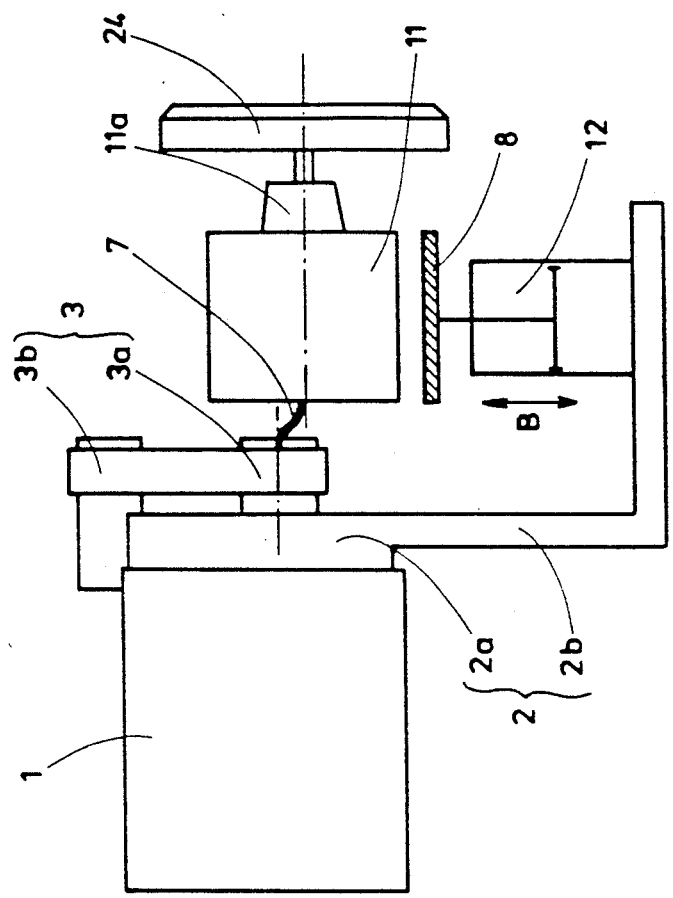
FIG. 2 is a side view of the device of FIG. 1.

According to FIGS. 1 and 2, the machining device is intended particularly to be fastened to the end of a robot arm, this end being shown diagrammatically in the Figures. This end, usually called a plate, has 1, 2 or 3 degrees of freedom in rotation from the end of the robot arm. The mechanical unit making the connection between the end of the arm and the plate is usually called a "wrist" (or sometimes "head"). This plate receives tools, such as tongs, welding tools, etc., connected to their supply system by means of hoses, cables, etc.

In the present case, this plate 1 receives the machining device according to the invention.

The machining device is composed of a support 2, the part 2a of which has fastening means (screw holes 2a') to be fastened to the plate 1 and the other part 2b of which, arranged in the extension of the part 2a carries the movable assembly described below.

The part 2a also carries a movement transmission arm 3, of which one end 3a is fastened pivotably to the part 2a and the free other end 3b is connected to the motor or drive means 4 by means of a transmission 5, such as a flexible cable or the like.

In fact, this transmission arm 3 contains a belt transmission formed from a pulley 6a coaxial relative to the pivot axis of the end 3a on the part 2a, a belt 6b and a pulley 6c located at the end 3b and connected to the transmission means 5.

Thus, the movement is transmitted from the end 3b to the end 3a by means of the belt 6b. At the end 3a, coaxially relative to this, the pulley 6a carries fixedly in terms of rotation a flexible transmission cable 7 connected to the movable assembly for the purpose of driving it.

The part 2b carries the movable assembly which is composed of a rigid arm 8 connected firmly to the end 9a of a deformable strip 9, the other end 9b of which holds a toolholder head 11. This deformable strip 9 is equipped with a strain-gauge sensor 10, if appropriate with a swamping resistance. This strain-gauge sensor 10 is intended for measuring the force exerted on the strip 9 in the direction of the double arrow A. This force is that generated by the components, parallel to the arrow, of the various accelerations exerted on the masses of the toolholder and tool, to which the force exerted by the tool on the piece to be machined is added vectorially.

Thus, according to FIG. 1, the effective direction of the tool which corresponds to the direction of movement of the toolholder head 11 is the vertical direction. This movement, even when very slight, is permited as a result of the relative flexibility of the strip 9, to which the toolholder head 11 is secured. this toolholder head 11 has a rotary part 11a, in which the tool, for example the shank of the cutter, is fastened. This part 11a is connected to the flexible cable 7 for the purpose of driving it in rotation.

The movable assembly also has a position-adjustment means consisting of a jack 12 which is fixed to the part 2b of the support 2 and the piston 12a of which is fixed to the rigid arm 8. Thus, the movement of the pistons 12a in the jack 12 controls the movement of the toolholer head 11 for the purpose of increasing or reducing the pressure exerted by the tool on the piece.

The two chambers 13', 13" of the jack 12 are connected to fluid pipelines 14', 14" travelling to a fluid source 16 via a proportional-action distributor, such as a servo-valve, servo-distributor or electro-pneumatic converter, symbolized in FIG. 1 by the slide 15 associated with the source 16 and with the control device 17 which receives the information signals from the strain-gauge sensor 11 via the line 18.

According to a useful characteristic, the device of the invention has a second flexible strip 20, the end 20a of which is connected to the rigid arm 8 and the other end 20b of which carries a weight. This strip is likewise equipped a strain-gauge sensor 21 connected to the control circuit 17 via the line 22.

The purpose of this sensor 21, which is an accelerometer, is to measure the components of the acceleration in the direction of the double arrow A. By means of the circuit 17, it makes it possible to calculate the forces of inertia exerted on the toolholder and deduce from them the actual force exerted by the tool on the piece. An additional advantage of this device is that it makes it possible to obtain what is called a "techometric return" in the servo control mechanism, thus improving the stability of the system and its response time.

In general terms, the adjustment means or jack 12 is preferably a pneumatic jack, and the fluid source 16 is a compressed-air source. In particular, this pneumatic jack can be a jack with two deformable chambers 13', 13" taking effect from either side of an element forming a piston floating without contact, the piston being connected and guided in terms of translational movement by means of connecting rods (not shown).

In general, the pressure exerted by the tool on the piece to be machined is a constant nominal pressure. However, this pressure can also change according to a predetermined program along the path followed by the tool at the end of the robot arm. The circuit 17 receiving the measurement of the actual pressure exerted by the tool on the piece uses this signal to control the jack 12 and subject the actual pressure to the nominal pressure, if appropriate taking into account the signals supplied by the second sensor 21.

The toolholder head 11 is driven by means of the transmission which, as already mentioned, comprises, on the one hand, the flexible cable 7 connecting the rotary part 11a of the head 11 to the axle of the transmission arm 3, this axle being fixed relative to the end 1 of the robot arm. This transmission are 3 is mounted pivotally about this axis of the part 2a of the support 2, so as not to impede the movement of the robot arm.

In general, the motor 4 is mounted at a fixed point, and the connection between the output of the motor 4 and the free end 3b of the transmission arm 3 is generally made by a flexible movement transmission cable.

In general terms, the toolholder head 11 executes a pivoting movement according to an arc of a circle, the centre of which is the connecting end 9a between the strip 9 and the rigid arm 8. This movement, once detected, is compensated by the corresponding movement of the jack 12 acting on the arm 8, so as to set the pressure exerted by the tool to the nominal value.

It is simple to use the above-described device, since, if the device is intended for machining pieces of geometrically complicated shape, the robot is educated in the customary way by guiding the tool by hand along the path which it must subsequently follow automatically. The robot then records, in its computer, the coordinates of this path and, if appropriate, a nominal pressure or different nominal pressures.

When this path is entered in the memory, the computer can control the automatic operation of the robot so that the letter carries out the work along the nominal path and at the nominal pressure.

FIG. 1 also shows the two left-hand and righthand stops 13 and 23 which limit the pivoting of the arm 3, so that the latter cannot execute a complete revolution and does not impede the movement of the machining device and of the end of the robot arm carrying it.

The side view in FIG. 2 shows some structural details more clearly. In particular, this Figure illustrates the arrangement of the transmission arm 3, of which the end fixed to the part 2a of the support 2 (free to pivot) is connected to the rotary part 11a of the toolholder head 11 by means of the flexible cable 7. This Figure also shows the tool 24 in the form of a cutter. The double arrow B shown on the jack 12 indicates the direction of movement of the movable assembly.

For the purpose of simplification, this Figure does not show a side view of the rigid arm 8, the flexible strip 9 and the strip 21 making it possible to take into account the inertia of the movable assembly during rotation.

The invention described above is not limited to its use on robot arms.

This device can also be stationary and the piece to be machined can pass over the tool carried by the toolholder head. This can relate, for example, to the machining of products in strip form which are unwound from a supply reel in order to pass over the tool, for example to be trimmed or machined along one or both edges and rewound again.

In this case, even if the tool does not have to follow a special path, as in the carding of a shoe upper, it is important that the pressure exerted by the tool should remain constant, and the device according to the invention makes it possible to ensure this.

I claim:

1. Machining device intended especially to be fastened to the end of a robot arm and having a cutter serving for carding in the shoe industry or for the clipping or polishing of pieces of complicated shapes, comprising:
   a toolholder head (11, 11a) for receiving a driven rotary tool (24),
   a movable assembly (12, 8, 9, 20) adjustable in the effective direction of the tool (A, B), provided with a rigid arm (8) carrying the head (11, 11a) and equipped with strain-gauge sensors (10) for measuring the force exerted by the tool (24) on the workpiece,
   a support (2) connected to the end (1) of the robot arm and carrying the movable assembly (12, 8, 9, 20),
   a control circuit (17) receiving the signals from the strain-gauge sensors (10) and controlling the movement of the movable assembly in order to make the pressure exerted by the tool on the workpiece subject to a nominal value,
   and a device (20) for measuring accelerations in the direction of the force to be exerted, in order to take into account forces due to inertia, including the disruptive component of the weight of the movable assembly.

2. Machining device intended especially to be fastened to the end of a robot arm and having a cutter serving for carding in the shoe industry or for the clipping or polishing of pieces of complicated shapes, comprising:
   a toolholder head (11, 11a) for receiving a driven rotary tool (24),
   a movable assembly (12, 8, 9, 20) adjustable in the effective direction of the tool (A, B), provided with a rigid arm (8) carrying the head (11, 11a) and equipped with strain-gauge sensors (10) for measuring the force exerted by the tool (24) on the workpiece,
   a support (2) connected to the end (1) of the robot arm and carrying the movable assembly (12, 8, 9, 20),
   an adjustable movable assembly connected to the support (2) by means of a controlled doubled-acting pneumatic jack (12) ensuring that the pressure of the tool is subject to the nominal pressure,
   and a control circuit (17) receiving the signals from the strain-gauge sensors (10) and controlling the movement of the movable assembly in order to make the pressure exerted by the tool on the workpiece subject to a nominal value.

* * * * *